United States Patent [19]

Hooper

[11] 4,432,411
[45] Feb. 21, 1984

[54] RADIANT HEAT SHIELD FOR A SUPERCONDUCTING GENERATOR

[75] Inventor: George D. Hooper, Murrysville, Pa.

[73] Assignee: Electric Power Research Institute, Inc., Palo Alto, Calif.

[21] Appl. No.: 354,488

[22] Filed: Mar. 3, 1982

[51] Int. Cl.³ ............................................. F24H 3/00
[52] U.S. Cl. .................... 165/47; 138/142; 138/143; 228/132; 310/52; 310/261
[58] Field of Search .................. 310/10, 40 R, 52, 61, 310/64, 261; 138/142, 143; 29/598, 599, 29/157.3 R; 228/132, 208, 209, 263; 165/47

[56] References Cited

U.S. PATENT DOCUMENTS

| | | | |
|---|---|---|---|
| 2,258,563 | 10/1941 | Armstrong | 138/142 |
| 3,598,156 | 8/1971 | Ulmer | 138/143 |
| 3,605,254 | 9/1971 | Armand | 228/132 |
| 3,750,248 | 8/1973 | Morris | 29/157.3 R |
| 3,837,688 | 9/1974 | Vollbehr | 228/132 |
| 4,162,758 | 7/1979 | Mikarai | 228/209 |
| 4,250,418 | 2/1981 | Eckels | 310/64 |
| 4,275,320 | 6/1981 | Baumann | 310/52 |
| 4,319,149 | 3/1982 | Eckels | 310/52 |

Primary Examiner—R. Skudy
Attorney, Agent, or Firm—William D. Lanyi

[57] ABSTRACT

A radiant heat shield for use in a superconducting generator is described which is formed by brazing an inner and an outer tube together. The inner tube has a plurality of coolant channels machined in its outer cylindrical surface. The brazing operation consists of applying a brazing compound to the outer cylindrical surface of the inner tube prior to cold working the two tubes together, followed by a heating to a temperature in excess of the melting point of the brazing compound.

9 Claims, 2 Drawing Figures

RADIANT HEAT SHIELD FOR A SUPERCONDUCTING GENERATOR

CROSS-REFERENCE TO RELATED APPLICATION

Copending patent application, Ser. No. 354,487 which was filed on Mar. 3, 1982 and assigned to the assignee of this application, is related to the invention of the present application.

BACKGROUND AND SUMMARY OF THE INVENTION

The present invention relates generally to the rotor of a superconducting generator and, more particularly, to the radiant heat shield used therein.

A superconducting generator typically has a supercooled rotor which includes a superconducting field winding and a structure for supporting the winding. During operation, the rotor is supercooled to a cryogenic temperature by circulating a fluid refrigerant, such as helium, proximate its conductive components. During normal operation of the generator, the liquid helium within the rotor is transformed into gas by a relatively slow but constant boiling.

The function of a superconducting rotor's radiant heat shield is to intercept heat that is radiated from the rotor's ambient surroundings, which are typicaly at room temperature, so as to prevent this radiated heat from raising the temperature of the cryogenic cold zone within the rotor. Typically, a radiant heat shield consists of a tubular structure disposed radially outward from the superconducting rotor field coils. This tubular structure is provided with a plurality of coolant channels therein along with a means for the refrigerant to pass radially into the radiant heat shield, move axially through it the coolant channels exit, via another radial passageway, toward the internal portion of the superconducting rotor. U.S. Pat. No. 4,250,418 issued to Eckels on Feb. 10, 1981 and copending U.S. patent application Ser. No. 143,205 filed on Apr. 24, 1980, now U.S. Pat. No. 4,312,149 by the present inventor and assigned to the present assignee are incorporated by reference herein and disclose, inter alia, particular designs of radiant heat shields. One object of the present invention is to provide a radiant heat shield for use with a superconducting generator which is designed to be manufactured in a reliable and yet economical manner.

The size of the radiant heat shield, in a typical superconducting generator, could exceed 130 inches in length and 30 inches in diameter and, since the radiant heat shield must be cooled with a plurality of coolant passages located within its cylindrical walls, these design parameters essentially require that it be made of a multiple-shell construction. The metallurgical bonding of these two shells must provide for an effectively sealed coolant channel network and must not distort the radiant heat shield nor weaken its structural integrity.

A radiant heat shield made in accordance with the present invention comprises an inner cylindrical tube and an outer cylindrical tube associated in coaxial and concentric relation. The inner tube has a network of coolant channels formed in its outer cylindrical surface. This coolant channel network can comprise two circumferential grooves located a predetermined axial distance apart from one another along with a plurality of axially extending grooves, with each axial groove intersecting and connecting the two above-described circumferential grooves. In this particular configuration of the coolant channel network, each circumferential groove is also provided with one or more radial holes which intersect it and provide fluid communication between it and the internal portion of the inner tube.

An outer cylinder is disposed radially outward from the inner tube and is metallurgically bonded to the inner tube to form a unitary radiant heat shield structure. The outer tube encloses the radially outward portion of each of the above mentioned grooves and thereby provides an enclosed coolant channel network which, in turn, provides fluid communication between the radial hole or holes which intersect one of the circumferential grooves and the radial hole or holes which intersect the other circumferential grooves.

In order to provide a suitable metallurgical bond between the inner and outer tubes, the outer cylindrical surface of the inner tube is coated with a brazing material prior to compressing the inner and outer tubes together. This compressing can be accomplished by co-cold rolling the inner and outer tubes together. As an alternative to co-cold rolling the tubes together, a heat shrinking operation can be used to assemble the inner and outer tubes together with a diametrical interference fit. Furthermore, the brazing material can be applied to both the inside cylindrical surface of the outer tube and the outside cylindrical surface of the inner tube. After the inner and outer tubes are compressed to form an intimate contact therebetween, the inner and outer tubes are heated to a temperature that exceeds the melting temperature of the above described brazing compound. Typical brazing compounds that may be used in accordance with the present invention are ones that contain 85% silver and 15% manganese, 7% silver with 85% carbon and 8% tin or a compound which contains boron, silicon and nickel. These brazing compounds have melting temperatures of 1760° F.-1780° F., 1225° F.-1805° F. and 1900° F., respectively. It should be understood that other suitable brazing compounds are included within the scope of the present invention.

Also, in order to provide a more reliable brazed joint between the inner and outer tubes, the inner tube may be nickel plated prior to the application of the brazing compound as described above. In accordance with the present invention, the nickel plating and brazing compound application are done in such a way as to avoid affecting the axially outboard portions of the cylindrical outer surface of the inner tube. The reason for this is to avoid contamination of this outer cylindrical surface of the inner tube in the regions of its axial termini. This is done to prevent any deleterious affect on a later welding operation which provides a seal weld between the inner and outer tubes at their axial termini.

Prior to the inner and outer tubes being cold worked or heat shrunk together, a removable substance may be disposed in the above mentioned channel network. This removable substance prevents any localized deformation of the outer tube into the channels during the compressing working operation. This substance can then be removed following the compressing procedure. Although many removable substances are available for this purpose, a meltable substance such as a low melting metal or sulphur, a combustible substance, such as polystyrene, or an etchable substance, such as carbon steel, may be used.

Following the compressing operation, the assembly can be heated to a temperature of approximately 1950°

F. for one hour. This raised temperature melts the brazing material that has been disposed between the inner and outer shells, performs a solution annealing of the weld metal used in the above mentioned seal weld and provides a solution annealing of the inner and outer shells. The assembly can then be heat treated by raising its temperature to approximately 1400° F. for five hours followed by 1200° F. for eight hours in order to properly age the components of the radiant heat shield. Finally, the assembly may be machined to final dimensional tolerances.

It should be apparent that the present invention provides a method of construction of a radiant heat shield which has good contact between the adjacent surfaces of the inner and outer tubes and prevents leakage of coolant either between adjacent axial grooves or between the coolant channel network and the surrounding environment which is typically a vacuum. It should further be apparent that the present invention provides a radiant heat shield, for use with superconducting rotors, that is manufacturable in a manner which results in a structure of high mechanical integrity and which also provides a reliable fluid containment for the superconducting rotor's refrigerant.

DESCRIPTION OF THE PREFERRED EMBODIMENT

The present invention relates generally to superconducting rotors and, more specifically, the manufacture of the radiant heat shield utilized therein.

Figure 1:
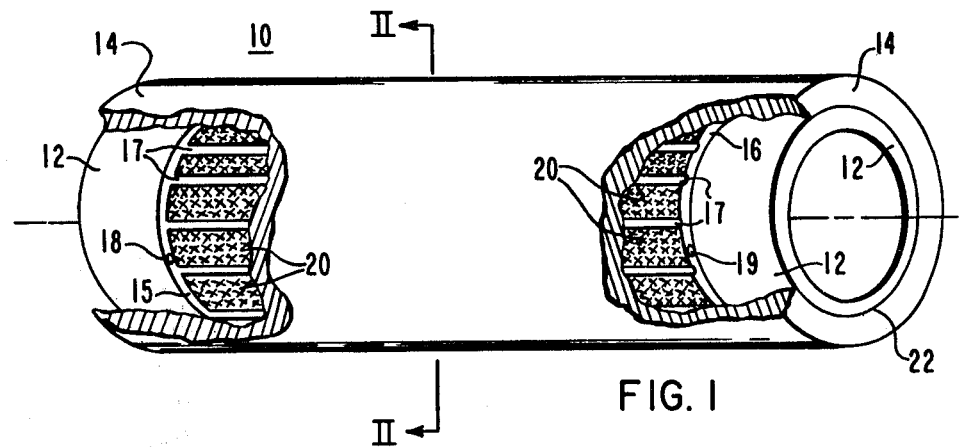
FIG. 1 shows an exemplary sectioned view of a radiant heat shield made in accordance with the present invention.

An exemplary illustration of a radiant heat shield 10 made in accordance with the present invention is shown in FIG. 1. It comprises an inner tube 12 with an outer tube 14 disposed around it in coaxial and concentric relation. A coolant channel network is provided in the outer surface of the inner tube 12. In FIG. 1 this coolant channel network consists of two circumferential grooves, 15 and 16, and a plurality of axial grooves 17 which intersect each of the two circumferential grooves, 15 and 16, and provide fluid communication therebetween. Two radial holes, 18 and 19, provide fluid communication between circumferential grooves, 15 and 16 respectively, and the internal cylindrical surface of the inner tube 12. It should be understood that more than one hole can be used to intersect each circumferential groove in order to increase the fluid flow to them and to more uniformly distribute the flow through the coolant network.

Prior to the assembly of the inner and outer tubes, the outside cylindrical surface of the inner tube is coated with a brazing compound at preselected portions 20 of this surface. In order to provide a better metallurgical bond, the inside cylindrical surface of the outer tube 14 can also be coated with the brazing compound. Of course, care should be taken to avoid putting the brazing compound in the immediate vicinity of the tubes' axial edges so as to not adversely affect a later seal welding operation which would provide a more reliable sealing of the coolant network between the two tubes. The outer tube 14 is then disposed around the inner tube 12 and the two tubes are compressed together by a suitable process, such as co-cold rolling. Although the present invention is described herein as employing a co-cold rolling operation, it should be understood that a heat shrinking procedure is equally applicable and is within the scope of the present invention. Heat shrinking would require that the inside diameter of the outer tube 14 be machined to a dimension which is slightly less than the outside diameter of the inner tube 12. Either heating the outer tube 14 or, alternatively, cooling the inner tube 12, would provide sufficient diametrical clearance to permit a coaxial and concentric assembly of the two tubes. Upon return to room temperature, the tubes would be compressed together as an alternative to the co-cold rolling described herein. After the inner 12 and outer 14 tubes are compressed together, the assembly is heated to a temperature that exceeds the melting temperature of the above described brazing compound. In order to assure a more suitable metallurgical bonding between the inner 12 and outer 14 tubes, the preselected portions of the outer cylindrical surface of the inner tube can be nickel plated prior to the application of the brazing compound. Also, in order to prevent any localized deformation of the outer tube into either the circumferential grooves, 15 or 16, or the axial grooves 17, these grooves can be filled with a removable substance prior to the inner 12 and outer 14 tubes being compressed together. This substance can either be meltable, such as a low melting metal or sulphur, combustible, such as polystyrene, or etchable, such as carbon steel. The brazing material can be any suitable brazing compound such as, but not limited to, 85% silver and 15% manganese (melting point 1760° F.-1780° F.) or 7% silver with 85% carbon and 8% tin (melting point 1225° F.-1805° F.).

After the inner 12 and outer 14 tubes are compressed to form a unitary assembly, they can be seal welded along the axial extremes of the interface 22 between the inner 12 and outer 14 tubes. In order to avoid contamination proximate this seal weld, the nickel plating and brazing compound applications should be done in such a way as to avoid affecting the axial extremes of the outer cylindrical surface of the inner cylinder 12.

Figure 2:
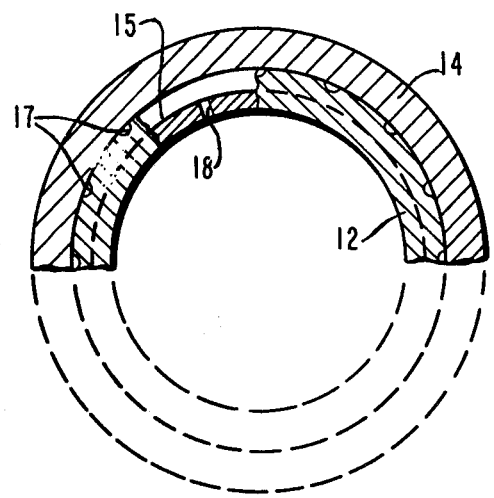
FIG. 2 illustrates a cross section view of the radiant heat shield shown in FIG. 1.

FIG. 2 is a section view of FIG. 1 showing the inner 12 and outer 14 tubes. Also, the relative radial positions of the axial grooves 17 and the circumferential groove 15 is shown. The representative radial hole 18 is shown intersecting the circumferential groove 15 and providing fluid communication between it and the internal portion of the inner tube 12. FIG. 2, along with FIG. 1, illustrates how a coolant could travel radially outward through radial hole 18, circumferentially around the inner tube in circumferential groove 15, axially between the inner 12 and outer 14 tubes in channels 17, circumferentially around circumferential channel 16 and radially inward through the representative radial hole 19, to provide a network for the coolant to travel through, and reduce the temperature of, the radiant heat shield. As discussed above, more than one radial hole can be used to provide fluid flow to or from each circumferential groove.

Referring again to FIG. 1, the radiant heat shield 10, after assembly of the inner 12 and outer 14 tubes as described above, is heated to a temperature of approximately 1950° F. for one hour to accomplish three functions. First, the brazing material is melted to create a metallurgical bond between the inner 12 and outer 14 tubes. Second, a solution annealing of the weld material located at the interface 22 between the inner 12 and outer 14 tubes is accomplished. Third, a solution annealing of the inner 12 and outer 14 tubes, which may have been work hardened by the cold rollng extrusion process described above, is accomplished. The radiant heat shield 10 is then aged by treatments of 1400° F. for five hours and then 1200° F. for eight hours. The radiant heat shield 10 then can be machined to its final size.

It should be apparent that the present invention provides a radiant heat shield for use in a superconducting rotor which is mechanically strong and which provides a coolant network therein. It should further be apparent that, although the present invention is described with considerable detail, it should not be considered to be so limited.

What I claim is:

1. A superconducting rotor, comprising:
   a first tube having two circumferential grooves formed in its outer cylindrical surface, said two circumferential grooves being a preselected axial distance apart, said first tube having a plurality of axial grooves formed in its outer cylindrical surface, each of said axial grooves intersecting said two circumferential grooves and providing fluid communication therebetween, each of said circumferential grooves having a hole intersecting it and extending radially inward to intersect the inside cylindrical surface of said first tube;
   a second tube disposed radially outward from said first tube in coaxial and concentric relation, said second tube providing a radially outer fluid seal for said circumferential and axial grooves; and
   a thin cylindrical layer of brazing material disposed between said first and second tubes, said layer of brazing material having an axial length which is less than the axial length of said first tube and less than the axial length of said second tube.

2. The superconducting rotor of claim 1, wherein:
   said metallurgical bond is achieved by coating preselected portions of said outer cylindrical surface of said first tube with a nickel plating substance, coating said preselected portions with a brazing compound, compressing said first and second tubes together and heating said first and second tubes to a temperature above the melting temperature of said brazing compound.

3. The superconducting rotor of claim 1, wherein:
   said metallurgical bond is achieved by coating preselected portions of the inner cylindrical surface of said second tube with a brazing compound, compressing said first and second tubes together and heating said first and second tubes to a temperature above the melting temperature of said brazing compound.

4. The superconducting rotor of claims 2 or 3, wherein:
   said brazing material is selected from the group consisting of 85%Ag-15%Mn and 7%Ag-85%C-8%Sn.

5. The superconducting rotor of claims 2 or 3, wherein:
   said brazing material has a melting point between 1225° F. and 1900° F.

6. The superconducting rotor of claims 2 or 3, wherein:
   said compressing is accomplished by co-cold rolling said first and second tubes together.

7. The superconducting rotor of claims 2 or 3, wherein:
   said compressing is accomplished by heat shrinking said first and second tubes together.

8. The superconducting rotor of claim 1, wherein:
   said first and second tubes are associated in cold rolled relation with each other.

9. The superconducting rotor of claim 1, wherein:
   said first and second tubes are associated in interference fit relation with each other.

* * * * *